UNITED STATES PATENT OFFICE.

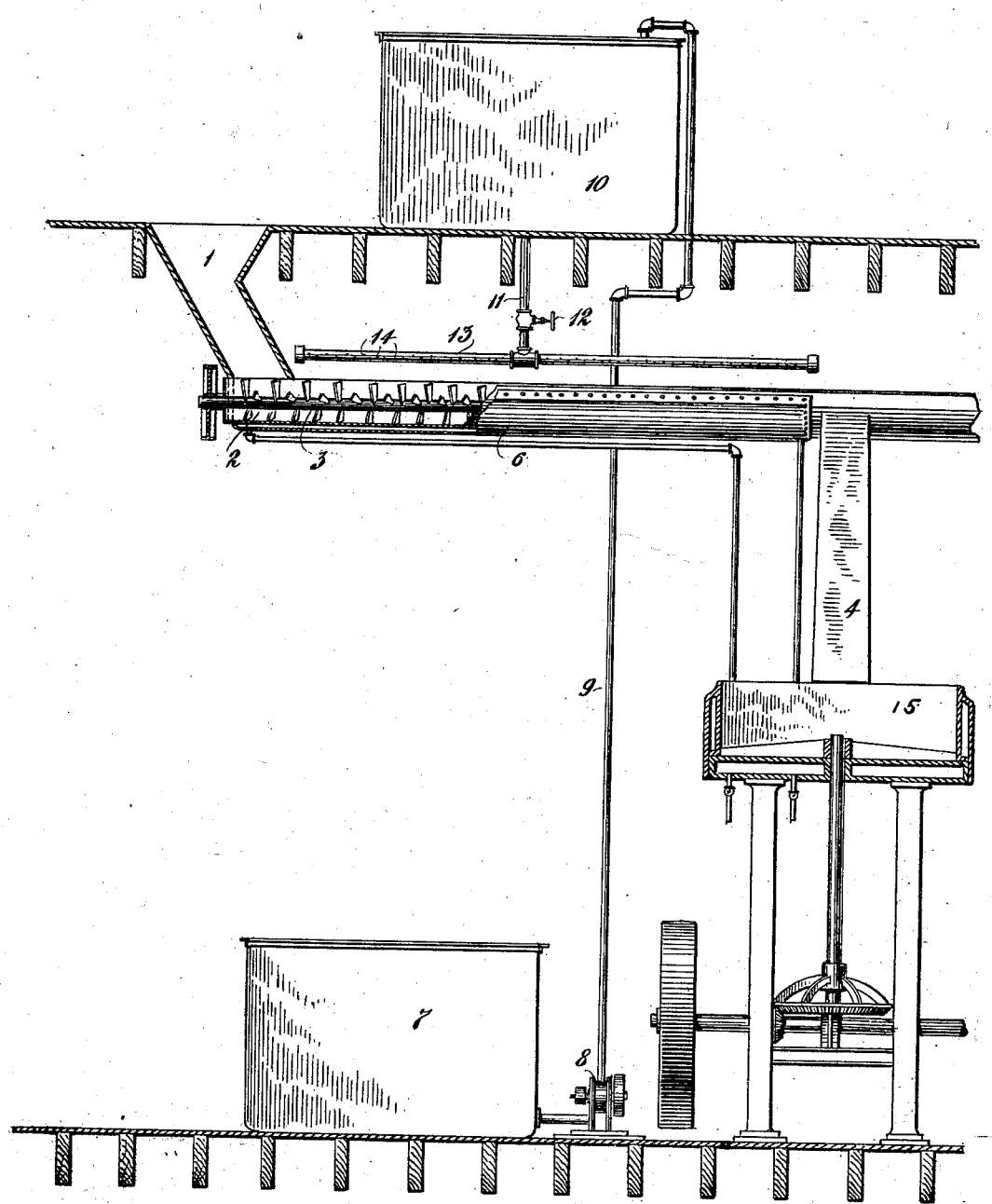

CECIL O. PHILLIPS, OF NEW YORK, N. Y., ASSIGNOR TO THE AMERICAN COTTON OIL COMPANY, OF NEW YORK, N. Y., A CORPORATION OF NEW JERSEY.

PROCESS OF PRODUCING COTTON-SEED OIL.

SPECIFICATION forming part of Letters Patent No. 705,785, dated July 29, 1902.

Application filed September 28, 1901. Serial No. 76,846. (No specimens.)

*To all whom it may concern:*

Be it known that I, CECIL O. PHILLIPS, a citizen of the United States, and a resident of the borough of Manhattan, in the city and State of New York, have invented a new and useful Process of Treating Cotton-Seed Meats, of which the following is a specification.

In the treatment of cotton-seeds for extracting from them the oil which they contain it is found desirable to first remove the hulls from the seeds and to then extract the oil from the kernels or meats of the cotton-seeds which remain after the hulls are removed, as the oil is more readily pressed out from the meal obtained by grinding the seed when only the meats are used, and, furthermore, the cake obtained from the seed after pressing out the oil is of more value when it contains no hulls. The hulls may be readily removed from the cotton-seeds by hullers, which break and rasp the hulls and liberate the meats contained therein. The hullers do not, as a rule, remove the endocarp or outer skin—*i. e.*, the membrane between the shell and kernel. The endocarp for the most part remains on the kernels and is disintegrated when they are passed through the crusher-rolls and reduced to a uniform meal.

The objects of my invention are to improve the quality of the oil produced from these cotton-seed meats and to increase the yield of oil.

According to the ordinary methods by which oil is obtained from the meats of cotton-seed the meats are first passed through rolls for the purpose of reducing them to a uniform meal, so that the oil may be more readily expressed from them. They are then cooked for a period of from fifteen to forty minutes in a steam-jacketed heater upon which a steam-pressure of from twenty to one hundred pounds is maintained, the pressure depending upon the condition of the meats and the temperature to which it is desired to subject them. This is done in order to expand the oil-cells and to permit a freer flow of oil than could be otherwise obtained when the meats are pressed, as the oil becomes more fluid at a higher temperature and the albuminous constituents of the meats are coagulated by the heat. However, the high temperature to which the oil contained in the meats is subjected while being cooked has an injurious effect upon the oil, this being due to the presence of free fatty acids which exist in the oil and which are also induced by such high temperature. According to my improved process the cotton-seed meats are treated with an alkali, preferably in solution, such as a solution of caustic soda, before they are cooked in the ordinary heater above referred to. I have obtained good results from a solution of caustic soda of a strength ranging from 3° to 10° Baumé, using two to three pounds of the solution to each one hundred pounds of cotton-seed meats. The preliminary alkaline treatment of the meats neutralizes a large percentage of the free fatty acids, thereby improving the quality of the oil and preventing the heating to which the meats are afterward subjected from having an injurious effect upon the quality of the oil. It is also found that a considerably larger amount of moisture can be added without injury during the process of cooking when the meats have been treated according to my process than according to the old methods, and thereby the yield of oil is increased. The action of the alkali upon the free fatty acids in the oil is such as to combine with and thereby neutralize them. The products formed by this action remain in the cake after pressing out the oil, constituting so small a percentage thereof that they in no way affect the cake or meal for feeding purposes.

Any suitable form of apparatus may be used for carrying out my invention. In order that the cotton-seed meats may be treated in large quantities in a continuous manner, it is desirable to use a mixer having an inlet into which the meats are introduced continuously and an outlet from which they are delivered continuously. The alkaline solution may be introduced into the mixer in any suitable manner, but preferably in the form of a spray. In order that the solution may be most thoroughly and intimately mixed with the cotton-seed meats, they are vigorously agitated while passing through the mixer, which may be done by a revolving beater. The blades or arms of the beater are preferably set so as to convey the cotton-seed meats along and through the mixer continuously. The mixer is preferably made of steel and is steam-jacketed, so that the meats can be slightly warmed during the process of mixing.

Reference is made to the drawing accompanying this specification, which shows a sectional elevation of one form of apparatus which may be used to carry out my improved process.

In the drawing, 2 represents a mixer provided with an inlet 1 and an outlet 4. Within the mixer is the revolving beater 3, which also acts as a conveyer to convey the cotton-seed meats from the inlet to the outlet, the blades or arms of the beater being set at an angle, so as to convey the meal which is being treated continuously, as well as to thoroughly agitate the same.

7 represents a tank in which the alkaline solution is to be mixed. The solution is drawn from this tank by a pump 8 and carried up the pipe 9 to the tank or reservoir 10. The pipe 11 extends from the bottom of this reservoir, and the supply of the solution is controlled by the valve 12. The solution descends by gravity into the horizontal pipe 13, having apertures 14, through which the alkaline solution passes, forming a spray immediately above the agitated mass of cotton-seed meats in the mixer, and the solution becomes thereby intimately and thoroughly mixed with the cotton-seed meats.

The casing of the mixer may be made of steel and steam-jacketed, as shown at 6, so that the mass can be slightly warmed during the process of agitation.

15 represents a steam-jacketed pan in which the meats are to be cooked after having been thoroughly treated in the mixer 2.

What I claim, and desire to secure by Letters Patent, is—

1. The process of producing cotton-seed oil, which consists in crushing the cotton-seed meats, neutralizing the free fatty acids contained therein by an alkali, and then expressing the oil therefrom, substantially as described.

2. The process of producing cotton-seed oil, which consists in crushing the cotton-seed meats, treating them with a small proportion of alkali, heating them, and then expressing the oil therefrom, substantially as described.

3. The process of producing cotton-seed oil, which consists in crushing the cotton-seed meats, warming them, neutralizing the free fatty acids contained therein with a slight excess of alkali, heating them to a higher temperature and then expressing the oil therefrom, substantially as described.

4. The process of producing cotton-seed oil which consists in crushing the cotton-seed meats, agitating them, subjecting them to an alkaline spray and pressing out the oil therefrom, substantially as described.

In witness whereof I have hereunto signed my name this 27th day of September, in the year 1901.

CECIL O. PHILLIPS.

In presence of—
D. HOLDEN,
JAMES J. COSGROVE.